United States Patent [19]

Parrotta

[11] 4,376,151

[45] Mar. 8, 1983

[54] PRESSURE THRESHOLD ADHESIVE

[75] Inventor: Michael A. Parrotta, North Tonawanda, N.Y.

[73] Assignee: Moore Business Forms, Inc., Grand Island, N.Y.

[21] Appl. No.: 278,870

[22] Filed: Jun. 29, 1981

[51] Int. Cl.[3] .................. B32B 5/16; C08U 7/02; C09J 7/02

[52] U.S. Cl. .................... 428/323; 428/215; 428/218; 428/325; 428/332; 428/334; 428/339; 428/343; 428/352; 428/354; 428/537; 428/913

[58] Field of Search ........... 428/323, 325, 343, 317.3, 428/304.4, 313.3, 313.5, 315.7, 315.9, 914, 321.5, 40, 326; 282/27.5

[56] References Cited

U.S. PATENT DOCUMENTS

| | | | |
|---|---|---|---|
| 2,655,453 | 10/1953 | Sandberg | 282/27.5 |
| 2,907,682 | 10/1959 | Eichel | 428/307.3 |
| 2,988,461 | 6/1961 | Eichel | 428/317.3 |
| 3,314,838 | 4/1967 | Erwin | 156/71 |
| 3,565,247 | 2/1971 | Brochman | 428/40 |
| 3,639,137 | 2/1972 | Marinelli | 428/321.5 |
| 4,223,067 | 9/1980 | Levens | 428/325 X |

FOREIGN PATENT DOCUMENTS 1484695 9/1977 United Kingdom ........... 428/914 X

Primary Examiner—Thomas J. Herbert, Jr.
Attorney, Agent, or Firm—Allegretti, Newitt, Witcoff & McAndrews, Ltd.

[57] ABSTRACT

A pressure threshold sensitive adhesive product which exhibits substantially no adhesive tack except upon the application thereto of a threshold pressure, e.g. about 50 pounds per square inch is disclosed. This adhesive product comprises a substrate having coated thereon a layer of a normally tacky, pressure-sensitive adhesive and a top layer of microspheres, preferably hollow microspheres, in an amount sufficient to cover the immediate adhesive layer. The application of the threshold pressure causes the microspheres to be displaced thereby exposing the normally tacky adhesive. The adhesive product is preferably manufactured by preparing a suspension of the microspheres in the normally tacky adhesive composition, coating the suspension on the substrate and promoting the microspheres to migrate to the top of the suspension and to form the top microsphere layer.

9 Claims, 3 Drawing Figures

U.S. Patent  Mar. 8, 1983  4,376,151
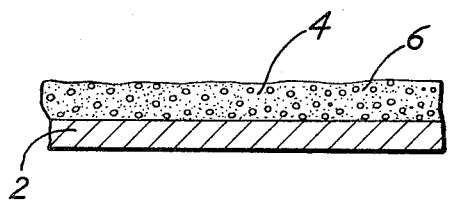
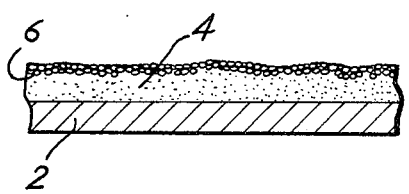
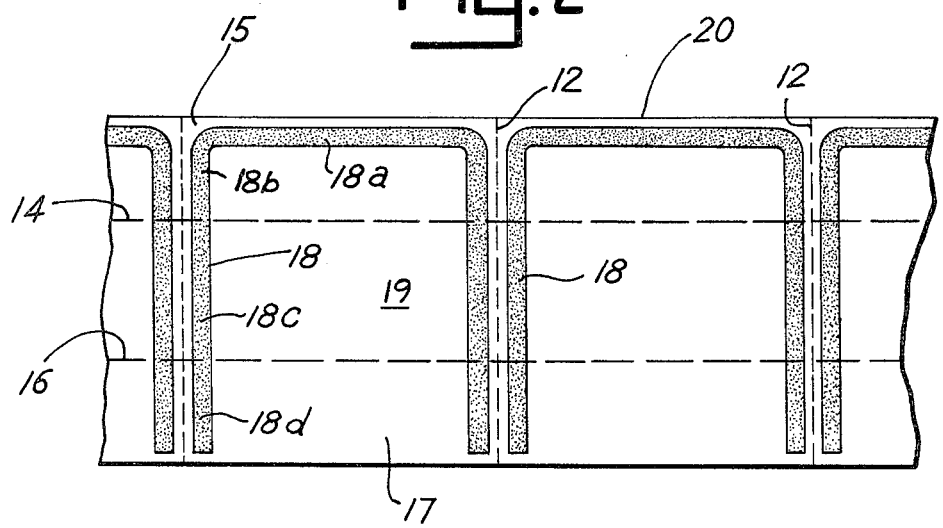

PRESSURE THRESHOLD ADHESIVE

BACKGROUND OF THE INVENTION AND DESCRIPTION OF THE PRIOR ART

The present invention pertains to adhesive compositions, particularly adhesive compositions for paper and business forms which normally exhibit no tack but which, upon application of pressure, exhibit normal adhesive properties.

Conventional adhesive coatings for paper products and business forms are generally very pressure sensitive or tacky. As a result, these coatings can attract and hold dust and dirt thereby loosing their adhesive properties. In addition, because these adhesive coatings are very pressure sensitive, paper products containing these coatings can be difficult to handle and process. In certain instances the prior art adhesive coatings inadvertently cause adjacent sheets of paper to stick together during processing. For example, business forms being processed from continuous rolls must have the ability to release from the opposite paper backing without transfer of the adhesive to the backing or tearing of the backing.

Adhesive coatings should also be relatively invisible so as not to distract from the appearance of the paper product. A business form adhesive should also remain intact when the business form is folded or handled. This requires a flexible coating that is color compatible with the paper substrate.

The prior art has attempted to overcome certain of these defiencies by encapsulating the adhesive in pressure rupturable capsules or in microscopic, closed cells. See for example Eichel, U.S. Pat. No. 2,907,682; Eichel U.S. Pat. No. 2,988,461; Brochman U.S. Pat. No. 3,565,247; and Marenelli U.S. Pat. No. 3,639,137. These techniques, however, require additional manufacturing costs associated with the encapsulation of the adhesive, or the attachment of the encapsulated adhesive to the substrate and are thus otherwise generally unsuitable for use in conjunction with the facile, economical production of paper products, particularly business forms paper products.

Levens U.S. Pat. No. 4,223,067, discloses a foam-like pressure sensitive adhesive tape comprising about 20-65 volume percent glass microbubbles uniformly dispersed throughout an adhesive matrix. The Levens tape has an adhesive thickness of 0.2 to 1.0 mm or more and can be covered by a low adhesion protective web. In addition, Levens indicates where strong bonds are required, a layer of unfilled pressure-sensitive adhesive should be applied on the microbubble filled adhesive. This structure is obviously not suited for use as an adhesive for business forms where a protective web on an unprotected pressure-sensitive surface is not desired.

Erwin, U.S. Pat. No. 3,314,838, discloses a pressure sensitive adhesive comprising a thin surface layer of adhesive over a monolayer of fragile, thin walled, hollow spheroidal particles, which in turn are in direct contact with a paper substrate. This structure fails to produce a pressure sensitive adhesive band suitable for use in business forms since it is activated by very low threshold pressure, e.g., hand pressure applied through a narrow squeegee or paper hangers' roller and is somewhat tacky to the fingers.

SUMMARY OF THE INVENTION

It is an object of the present invention to provide an adhesive product which exhibits substantially no adhesive tack except upon the application of a predetermined threshold pressure.

It is a further object of the present invention to provide a method for the manufacture of an adhesive product which exhibits substantially no adhesive tack except upon the application of a predetermined threshold pressure.

It is a specific object of the present invention to provide a business form product exhibiting no adhesive tack except upon the application of a pre-determined threshold pressure which is transparent, flexible and has a pebble finish.

It is a specific object of the present invention to provide a business form product having an adhesive surface exhibiting substantially no adhesive tack except upon the application for a threshold pressure and which can be activated without the application of heat or moisture.

In a broad embodiment, the present invention relates to an adhesive product, such as a business form, which exhibits substantially no adhesive tack except upon the application of a threshold pressure. This adhesive product comprises a substrate containing an intermediate layer of a normally tacky pressure-sensitive adhesive. Superimposed over the normally tacky pressure-sensitive layer is a top layer of microspheres, preferably hollow microspheres, that are insoluble in the normal tacky adhesive, in an amount sufficient to cover the adhesive layer and to provide an adhesive surface exhibiting substantially no adhesive tack when the microsphere layer remains intact but, which, exhibits tack when the intermediate adhesive layer is exposed by displacement of the top microspheres by the application of a pre-determined threshold pressure. Preferably, the microspheres have an average particle size from about 20–80 microns and comprise about 15 percent to about 25 percent by weight of the total composite adhesive and microsphere layer. Preferably, the total thickness of the composite adhesive-microsphere layers is about 0.076 to about 0.102 millimeters. The top microsphere layer of the total composite is about 20% to about 40% of the total composite. As indicated, the adhesive product of the present invention exhibits substantially no adhesive tack under normal conditions and exhibits no tacky feel to its fingertips. However, upon the application of a threshold pressure such as about 50 pounds per square inch, the adhesive layer is "activated" so that it can now attach to another surface to form a permanent bond.

In another embodiment of the present invention, there is provided a method for manufacturing pressure-sensitive adhesive products which comprises admixing, preferably at room temperature, a normally tacky adhesive composition with microspheres having a density less than the normally tacky adhesive to provide a suspension of microspheres in the adhesive. This suspension is then coated onto a substrate and maintained at conditions sufficient to permit at least a portion of the microspheres to rise or float to the top of the coating to provide when dried, cooled, or cured a finished coating on the substrate when is not tacky or which exhibits no tacky feel to the fingertips until the microspheres are displaced by the application of a pre-determined threshold pressure. The floatation of the microspheres to the top of the coating, forms a top layer of microspheres superimposed over and attached to a lower adhesive layer.

Other objects and embodiments of the present invention are described in the following detailed description of the present invention.

BRIEF DESCRIPTION OF THE DRAWING

FIG. 1A is a schematic enlarged side-sectional view of an adhesive product in accordance with the present invention during the initial stage of a preferred method of its production.

FIG. 1B is a schematic enlarged cross-sectional view of the final adhesive product in accordance with the present invention.

FIG. 2 is a plan view of a business form utilizing adhesive product of the present invention.

DETAILED DESCRIPTION OF THE PRESENT INVENTION

The adhesive product of the present invention comprises an intermediate layer of a normally tacky pressure-sensitive adhesive on a suitable substrate, preferably a flexible substrate such as paper utilized in the manufacture of a modern business form. The identity of the normally tacky pressure-sensitive adhesive is not critical to the practice of the present invention and any normally tacky adhesive composition used in the manufacture of business forms can be used. For example, various polymeric resins suitable for use as adhesives can be used. This includes 2-ethyl hexyl acrylate, butyl acrylates, ethyl acrylate, vinyl acetate, ethylene vinyl acetate, ethylene ethyl acrylate, ethyl methacrylate, methacrylic acid, acrylic acid, carboxylated styrene butadiene rubber latex (X-SBR), styrene butadiene latex, neoprene, carboxylated neoprene latex, urethane latex, vinyl pyrrolidone, acrylonitrile, and vinyl chloride. In addition, these normally tacky, pressure sensitive polymeric resins can be formulated with suitable plasticizers, (phthalates, phosphates or adipates) processing oils, fatty amines, fatty acids, glycol derivatives, solvents and the like.

Tackified polymeric resins can also be used in the manufacture of the adhesive products of the present invention. Suitable tackified polymeric resins include polyisoprene, styrene-butadiene, polyvinyl alcohol, polyvinyl acetate, polyisobutene, polyisobutylene, polyacrylonitrile, polyvinylchloride, rosin esters, hydrogenated rosin esters, aliphatic hydrocarbons, aromatic hydrocarbons, terpene hydrocarbons, polymerized rosin esters, including phenolic modified rosin esters.

The other essential component of the present invention are the microspheres. Microspheres are preferably hollow microspheres that are substantially insoluble in the normal tacky adhesive product. Preferably, the microspheres have an average particle size of about 20 to about 80 microns and are admixed with the normally tacky adhesive in an amount of about 15 percent to about 25 percent by weight of the total adhesive and microsphere mixture. Suitable microspheres include polytetrafluoroethylene microspheres, phenolic microspheres such as manufactured by Union Carbide under designation BJO-0840; BJO-0930; or BJO-0931, sodium borosilicate microspheres such as manufactured by Emerson & Cuming, Inc. under designation IG-101, IGD-101, or IG-25; silica microspheres such as manufactured by Emerson & Cuming Inc. under designation R, Sl, or VT or ceramic microspheres such as manufactured by Emerson & Cuming, Inc. under the designation FA-F.

The adhesive product of the present invention can be manufactured by a variety of methods. For example, the product can be manufactured by first placing a solution, suspension or emulsion of the normally tacky pressure-sensitive adhesive on the substrate. A top layer of microspheres is then superimposed over and attached to an adhesive layer. The microspheres, since they are less dense than the adhesive, remain or float on the top of the adhesive surface thereby providing an adhesive product exhibiting substantially no adhesive tack as long as the microsphere layer remains intact. However, when the microspheres are displaced by pressure, the lower adhesive layer is exposed thereby rendering and providing an adhesive surface.

A particularly preferred method of forming the adhesive product of the present invention is to admix a solution, suspension or emulsion of the normally adhesive composition with the microspheres and to then coat the resultant suspension of microspheres and adhesive on the substrate. Since the microspheres have a density of less than a normally tacky adhesive product, they will float or rise to the top of the adhesive composition when it is coated on the substrate provided that conditions sufficient to permit the microspheres to rise or float to the top of the coating are present. For example, this would require maintaining a sufficiently low initial viscosity in the adhesive composition so that the microspheres will have sufficient opportunity to migrate or float to the top of the adhesive. Similarly, by retarding the rate by which the adhesive dries, polymerizes or otherwise solidifies will also enhance the ability of the microspheres to rise to the surface of the coating and thereby provide finished coating which is not tacky until the microspheres are displaced by the application of a pre-determined threshold pressure of greater than 50 lbs/in$^2$, preferably about 50 to 100 lbs/in$^2$.

The final product of the present invention as manufactured in accordance with a preferred embodiment of this invention, further described by reference to FIGS. 1A and 1B. Referring to FIG. 1A, there is illustrated a paper substrate 2 having superimposed thereon a relatively uniform emulsion of microporous spheres 6 in a continuous, adhesive matrix 4. This emulsion is formed by admixing the spheres and the adhesive in a suitable mixing device and coating the resulting emulsion, by means well known to those trained in the art, to substrate 2. As the adhesive dries or otherwise solidifies, the spheres migrate or float to the top of the adhesive. When the adhesive is completely dried less than 30-40 percent of the microspheres are still suspended in the bulk portion of adhesive. Rather, the great majority of the spheres have floated to the top of the adhesive to provide the structure illustrated in FIG. 1B. The application of pressure, however, causes the microspheres 6 to be displaced and/or, to a substantially lesser degree, rupture thereby exposing the matrix of adhesive 4 for attachment to a suitable surface.

The product illustrated in FIG. 1B can be sealed to another surface simply by the application of pressure. No heat or moisture need be applied by the surface. In addition, the microsphere-adhesive layer provide a transparent surface having a pebble finish that is flexible so as to permit folding of the substrate 2. This permits the adhesive product to be used in the manufacture of a modern business form.

The utilization of the adhesive composition of the present invention as utilized in the manufacture of a continuous business form is described and illustrated in FIG. 2. Referring to FIG. 2, there is illustrated a series of individual mailing forms 20 at an intermediate stage of construction. Each mailer 20 is formed by providing a plurality of transverse scores or perforations 12 to provide the individual discrete mailers 20 from the continuous substrate 10. Adhesive is applied to each form 20 in a generally C-shaped pattern as illustrated, to provide a longitudinal section 18a, and a pair of transverse section 18, each transverse section having an intermediate portion 18c positioned between by outer portions 18b and 18d. A longitudinally extending perforation or score 14 provides, on each form 20, an upper section 15. Similarly, longitudinally extending score or perforation 16 provides, on each form 20, a lower section 17. Positioned between upper section 15 and lower section 17 on each form is an intermediate section 19.

After the adhesive is placed on the continuous form, and the microspheres have had sufficient time to be positioned on the surface of the adhesive to provide a normally tack free surface, the final mailer product is formed by folding lower section or flap 17 upward and upper section or flap 15 downward thereby causing the adhesive sections 18b and 18d to contact each other. When threshold pressure e.g., 50 to 100 pounds/in² is applied to the adhesive, the adhesive sections 18b and 18d engage each other to form a strong bond that cannot be separated without tearing the fibers of the paper substrate. Section 18a, in turn, contacts the backside of section 17 and when sealed, by the application of pressure, forms a final enclosed mailer construction.

EXAMPLES

Example 1

Rhoplex N619 an acrylate emulsion, was added in the amount of 630 grams to a 3,000 ml stainless steel beaker. Seventy grams of IG-101 glass micro balloons were blended with the acrylate emulsion in a Cowles-like mixing head at 500–1,000 rpms. An emulsion, stabilizer, Aerosol OT, was then added to the blend in the amount of 2.2 grams with continuous stirring. 1.7 grams of a suitable defoamer, Colloids 796 was also added to the blend. The materials were blended for about 15 minutes until a uniform suspension of micro balloons in the adhesive emulsion was obtained. The rate of mixing was increased to 1200–1500 rpms for the final minute of mixing. The final emulsified product was then coated to a thickness of 0.5 to 3.0 mils on a paper sheet (15–60 pound stock) and permitted to solidify. The resultant, solidified surface was noticably tack-free to finger touch. However, when pressure (50#/sq in) was applied to the surface, the resultant adhesive coating was activated and became fully functional.

EXAMPLE 2

Carboxylated neoprene latex 102, in the amount of 342 grams, was blended in a 3,000 milliliter stainless steel beaker with 120 grams of Union Carbide BJO-0930 microspheres in a Cowles-like mixing head at 500–1,000 rpms. Cymel 301, a cross linking agent was the added in the amount of 5 grams. In addition, 5 grams of a defoamer, Nopco-NXZ was added until a uniform dispersion of the micro balloons in the latex was obtained. The resultant emulsion was then coated to a thickness of 0.5 to 3 mils on a paper sheet, as in Example 1 and permitted to solidify. The surface became noticably tack-free to finger touch and was activated on the application of suitable pressure.

EXAMPLE 3

Tabulated below are suitable components, with recommended concentration ranges, that can be used in the production of a pressure-sensitive (P/S) adhesive.

|  | % By Wt. |
|---|---|
| Emulsion/Solvent or Solventless 2-ethylhexyl acrylate | 5–50 |
| Butyl Acrylate | 10–60 |
| (tertiary) Butyl Acrylate | 10–60 |
| Ethyl Acrylate | 10–40 |
| Methyl Acrylate | 0–5 |
| Methyl Methacrylate | 0–5 |
| Acrylic Acid | 0–10 |
| Methacrylic Acid | 0–10 |
| Vinyl Acetate | 0–10 |

To this emulsion, phenolic microspheres, as manufactured by Union Carbide (BJO-084/BJO-0930/BJO-0931), sodium borosilicate, silica or ceramic microspheres as manufactured by Emerson & Cuming Inc. (IG-101/IGD-101/IG-25, R/SL/VT, FA-F) can be admixed with the pressure-sensitive (P/S) adhesive compositions in the ratios set forth below (parts or parts by weight).

|  | (A) | (B) | (C) | (D) |
|---|---|---|---|---|
| P/S Adhesive | 50 | 60 | 75 | 90 |
| Microspheres | 50 | 40 | 25 | 10 |

The microspheres and adhesive are mixed at room temperature by charging a mixing kettle with the pressure-sensitive adhesive composition and stirring at a low speed for five minutes. While stirring at a low speed, the microspheres are slowly added over a 15 minute period of time until a homogeneous system is obtained. The adhesive is then permitted to stir for an additional 30 minutes and defoamer and distilled water are added to adjust the viscosity of the adhesive composition. The adhesive composition is then applied to a substrate and then dried. The activation test pressure for each of the formulations set forth above are set forth below:

|  | (lbs/In. in.) | | | |
|---|---|---|---|---|
|  | (A) | (B) | (C) | (D) |
| Activation Test Pressure | 230 | 210 | 190 | 175 |

In addition, the adhesive film utilized in these tests was coated on a 50–60 pound offset stock with a coating thickness of about 3.0 to 4.0 mils. In addition to being activated at the pressure set forth above, these compositions satisfactorily passed standard blocking and UV stabilization tests.

What is claimed is:

1. An adhesive product which exhibits substantially no adhesive tack except upon the application of a threshold pressure which comprises:
   (a) a substrate;
   (b) an intermediate layer of normally tacky, pressure sensitive adhesive on the substrate; and
   (c) a top layer of microspheres superimposed over and attached to the intermediate adhesive layer in an amount sufficient to sufficiently cover the adhesive layer and to provide an adhesive product exhibiting substantially no adhesive tack while the microsphere layer remains intact and exhibiting tack upon exposing the intermediate adhesive layer by displacement of the top microsphere layer by the application of a threshold pressure, the top microsphere layer forming a layer that is separate and distinct from the intermediate adhesive layer.

2. A pressure threshold sensitive adhesive product as in claim 1 wherein the microspheres are hollow microspheres.

3. A pressure threshold sensitive adhesive product as in claim 1 wherein the microspheres are insoluble in the normally tacky adhesive.

4. A pressure threshold sensitive adhesive product as in claim 1 wherein the microspheres have an average particle size of about 20 to about 80 microns.

5. A pressure threshold sensitive adhesive product as in claim 1 wherein the microspheres comprise about 15% to about 25% by weight of the adhesive and microsphere layers.

6. A pressure threshold sensitive adhesive product as in claim 1 wherein the pressure threshold is at least 50 pounds per square inch.

7. A pressure threshold sensitive adhesive product as in claim 1 wherein the total thickness of the adhesive and microsphere layers is about 0.076 to about 0.102 mm.

8. An adhesive product which exhibits substantially no adhesive tack except upon the application of a threshold pressure which comprises:
   (a) a substrate;
   (b) an intermediate layer of normally tacky, pressure sensitive adhesive on the substrate; and
   (c) a top layer of hollow microspheres having an average particle size of about 20 to about 80 microns superimposed over and attached to the intermediate adhesive layer in an amount sufficient to sufficiently cover the adhesive layer and to provide an adhesive product exhibiting substantially no adhesive tack while the microsphere layer remains intact and exhibiting tack upon exposing the intermediate adhesive layer by displacement of the top microsphere layer by the application of a threshold pressure of at least 50 pounds per square inch, the microspheres having a density less than the normally tacky adhesive and being insoluble in the normally tacky adhesive, the microspheres comprising about 15 percent to about 25 percent by weight of the total weight of the adhesive and microsphere layers, and the adhesive and microsphere layers having a total thickness of about 0.076 to about 0.102 mm.

9. A business form comprising a substrate containing pressure sensitive adhesive-microsphere layers in accordance with claim 1, 2, 3, 4, 5, 6, 7, or 8, said layers positioned so as to be on selected portions of the business form and capable of forming a bond when contacted and a threshold pressure is applied thereto.

* * * * *